United States Patent [19]

Nonaka

[11] Patent Number: 5,448,454
[45] Date of Patent: Sep. 5, 1995

[54] VEHICLE LAMP DEVICE

[75] Inventor: Hideo Nonaka, Isehara, Japan

[73] Assignee: Ichikoh Industries, Ltd., Tokyo, Japan

[21] Appl. No.: 159,489

[22] Filed: Nov. 30, 1993

[30] Foreign Application Priority Data

Nov. 30, 1992 [JP] Japan ................................ 4-082474 U
Dec. 3, 1992 [JP] Japan ................................ 4-083457 U
Jan. 26, 1993 [JP] Japan ................................ 5-001550 U

[51] Int. Cl.6 .............................................. F21Q 1/00
[52] U.S. Cl. ........................................ 362/61; 362/80; 362/309; 362/328
[58] Field of Search ................ 362/61, 80, 309, 328, 362/332; 340/463, 464, 472, 815.73, 815.75, 815.76

[56] References Cited

U.S. PATENT DOCUMENTS

| 4,163,275 | 7/1979 | Weber et al. | 362/80 |
| 4,849,861 | 7/1989 | Arima | 362/61 |
| 4,912,606 | 3/1990 | Yamamoto | 362/61 |
| 4,922,398 | 5/1990 | Muto | 302/296 |
| 5,081,564 | 1/1992 | Mizoguchi et al. | 362/61 |
| 5,084,805 | 1/1992 | Goto | 362/61 |

Primary Examiner—Ira S. Lazarus
Assistant Examiner—Sara Sachie Raab
Attorney, Agent, or Firm—Foley & Lardner

[57] ABSTRACT

A vehicle lamp device includes a lamp housing supporting a bulb, a lens fixed in an opening of the lamp housing, a shade plate disposed between the lamp housing and the lens for intercepting a part of a light bundle emitted from the bulb. A resin projection for fixing the shade plate to the lamp housing juts out from the lamp housing toward the lens. A hole for receiving the resin projection is formed in the shade plate.

9 Claims, 14 Drawing Sheets

F I G. 16
F I G. 17
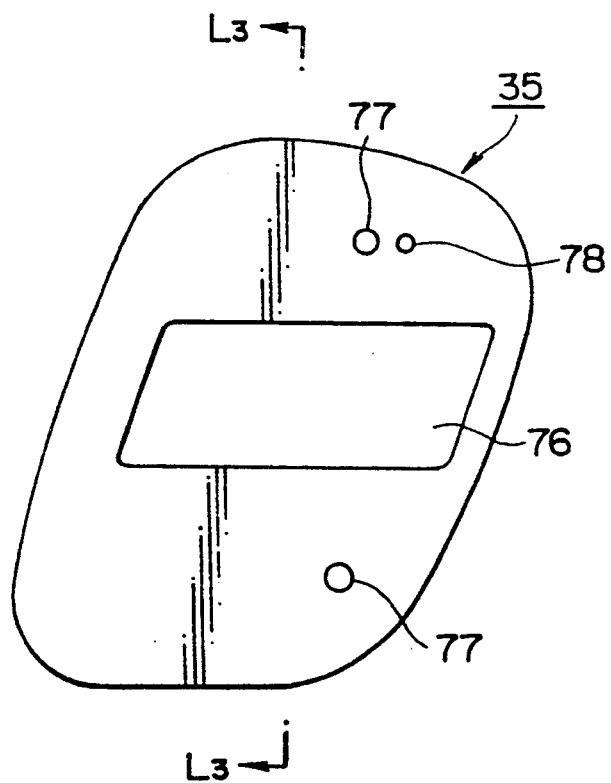
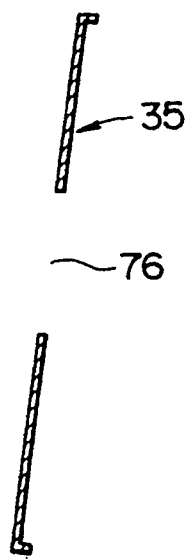

VEHICLE LAMP DEVICE

BACKGROUND OF THE INVENTION

1. Field of the Invention

This invention relates to the improvement of a vehicle lamp device such as a vehicle signal lamp (e.g. a turn signal lamp or combination lamp), side marker lamp, or projector head lamp.

2. Description of the Prior Art

Heretofore, a vehicle lamp device 1 is known as shown in FIG. 18. The vehicle lamp device 1 is provided with a lamp housing 2 and a lens 3. A bulb 4 is supported by the lamp housing 2. A groove 6 for fitting the lens 3 is formed along the periphery of an opening 5 of the lamp housing 2. A fitting portion 3a of the lens 3 is fit in the groove 6. The groove 6 is provided with a hot melt material 7 as a sealing member. A lamp chamber 8 is formed between the lens 3 and the lamp housing 2.

A design for a vehicle body is diversified these days. With its diversification, a design for the vehicle lamp device 1 is regarded as important in order to improve the appearance of the vehicle. To do so, the lens 3 of the vehicle lamp device 1 is, for example, curved from the front (or rear) of the vehicle to the side thereof. In other words, in the vehicle lamp device 1 produced nowadays, the lens 3 is made larger and slenderer than is needed.

However, such a design results in an undesirable fact that an unnecessary light bundle inevitably comes out of the device 1 This light bundle makes the distinction between a luminous portion and a dark portion become unclear.

In order to solve this problem, it has been proposed that a metallic shade plate 9 be disposed between the lamp housing 2 and the lens 3 to intercept part of the unnecessary light bundle. The shade plate 9 serves to intercept part of a light bundle P emitted from the bulb 4 and clarify a border line between a luminous portion of the device 1 and a dark portion thereof. The shade plate 9 is fixed to a boss 10 of the lamp housing 2 by means of a screw 11.

However, since the shade plate 9 of the conventional vehicle lamp device 1 is fixed to the lamp housing 2 by means of the screw 11, much time is consumed in its fixation and further the number of parts are enlarged disadvantageously. In this connection, U.S. Pat. No. 4,922,398 (Date of Patent: May 1, 1990) discloses a lamp assembly in which a shade is fixed to a lamp housing with a screw.

Another conventional vehicle lamp device 1 is also known as shown in FIG. 19. The vehicle lamp device 1 in FIG. 19 includes a lens 3 made up of an outer lens 3b and an inner lens 3c. The inner lens 3c is colored and transparent. As shown in FIG. 20, the inner lens 3c serves as a reflex reflector lens. The inner lens 3c is made up of a reflex reflector lens portion 12 and a side marker portion 13. The reflex reflector lens portion 12 is made up of a number of small quadrangular pyramids. The side marker portion 13 is made up of a diffusion lens. Part of those quadrangular pyramids and diffusion lens is shown in FIG. 20.

In the vehicle lamp device 1, a light bundle P emitted from the bulb 4 is directed either directly toward the outer lens 3b and the side marker 13 each in front of the bulb 4, or indirectly toward them after the light bundle P is first reflected by a reflection surface 14. Accordingly, the light bundle P is guided in a desired direction.

The reflex reflector portion 12 of the inner lens 3c serves to reflect both a light ray incident upon the lamp housing 2 from the outside and a light bundle directed to the reflex reflector portion 12 from the lamp housing 2.

However, because the inner lens 3c is colored and transparent, it is impossible to reflect them perfectly. Especially, a light ray H' incident upon the lamp housing 2 from the outside shows a given color when the light ray H' passes through the reflex reflector portion 12. Therefore, there is a problem in that the reflection surface 14 is regarded as colored due to the light ray H'. Further, a light bundle passing through the border portion 15 between the reflex reflector portion 12 and the side marker lens portion 13 is reflected irregularly. Therefore, when the lamp device 1 is lighted, the border portion 15 becomes vague.

A construction similar to that of the vehicle lamp device 1 shown in FIG. 20 is disclosed in U.S. Pat. No. 4,912,606 entitled Vehicle Lamp Device (Date of Patent: Mar. 27, 1990, Inventor: Hiroshi Yamamoto).

In the lamp device of U.S. Pat. No. 4,912,606, a reflex reflector lens is disposed along a clear lens and part of the reflex reflector lens is provided with a side marker lens portion. However, the thus arranged lamp device still has the drawback as mentioned above.

SUMMARY OF THE INVENTION

It is a first object of the present invention to provide a vehicle lamp device in which a shade plate can be easily fixed to a lamp housing.

It is a second object of the invention to provide a vehicle lamp device in which a nice appearance is maintained regardless of a reflex reflector lens portion provided in a lens of the lamp device.

It is a third object of the invention to provide a vehicle lamp device in which a reflex reflector lens portion is provided with a side marker portion, so that a border line between the side marker portion and the reflex reflector lens portion is made clear.

In order to attain the first object, the vehicle lamp device according to the invention includes a lamp housing for supporting a bulb; a lens fixed in an opening of the lamp housing; a shade plate disposed between the lamp housing and the lens, for intercepting part of a light bundle emitted from the bulb; a resin projection jutting out toward the lens, for fixing the shade plate to the lamp housing; and a hole formed in the shade plate, for fitting the shade plate with the projection. Because the shade plate is fixed to the lamp housing by means of the resin projection inserted into the hole, a part for fixation is not required and the appearance of the device is not injured. Further, the automatic assembly of the vehicle lamp device is carried out more easily than the prior art.

Further, the shade plate is made of a thin metallic plate; a plurality of slits are formed around the hole, the slits each directing to the center of the hole; a plurality of slices are formed by the slits, the slices being raised when the projection of the lamp housing is inserted into the hole of the plate to engage the plate with the projection. Accordingly, the shade plate is firmly prevented from coming off from the projection or rotating about the projection because of the vibration of the vehicle.

Further, in order to fix the shade plate to the lamp housing, a plurality of resin projections may be formed on the lamp housing, and a flange may be formed on the periphery of the shade plate by bending the plate toward the lamp housing so that the flange is engaged with the resin projections.

In order to attain the second object, the vehicle lamp device according to the invention includes a lamp housing for supporting a bulb; a lens fixed in an opening of the lamp housing; a reflex reflector lens provided along the lens; and a shade plate disposed between the lamp housing and the reflex reflector lens, for intercepting part of a light bundle emitted from the bulb. The peripheral shape of the shade plate corresponds to that of the reflex reflector lens. According to the lamp device arranged above, since a light ray which has passed through the reflex reflector lens from the outside cannot reach the reflection surface of the lamp housing because of the obstruction of the shade plate, the deterioration in appearance caused by the disposition of the reflex reflector lens is prevented.

In order to attain the third object, an opening is formed in the shade plate, the opening being opposite to the side marker portion provided in the reflex reflector lens of the vehicle lamp device according to the invention. Accordingly, it is possible to clarify the border line between the side marker portion and the reflex reflector lens.

BRIEF DESCRIPTION OF THE DRAWINGS

FIG. 16 is a plan view of a shade plate shown in FIG. 18.

FIG. 17 is a cross-sectional view taken along line L3—L3 in FIG. 16.

DETAILED DESCRIPTION OF THE PREFERRED EMBODIMENTS

First Embodiment

Figure 1:
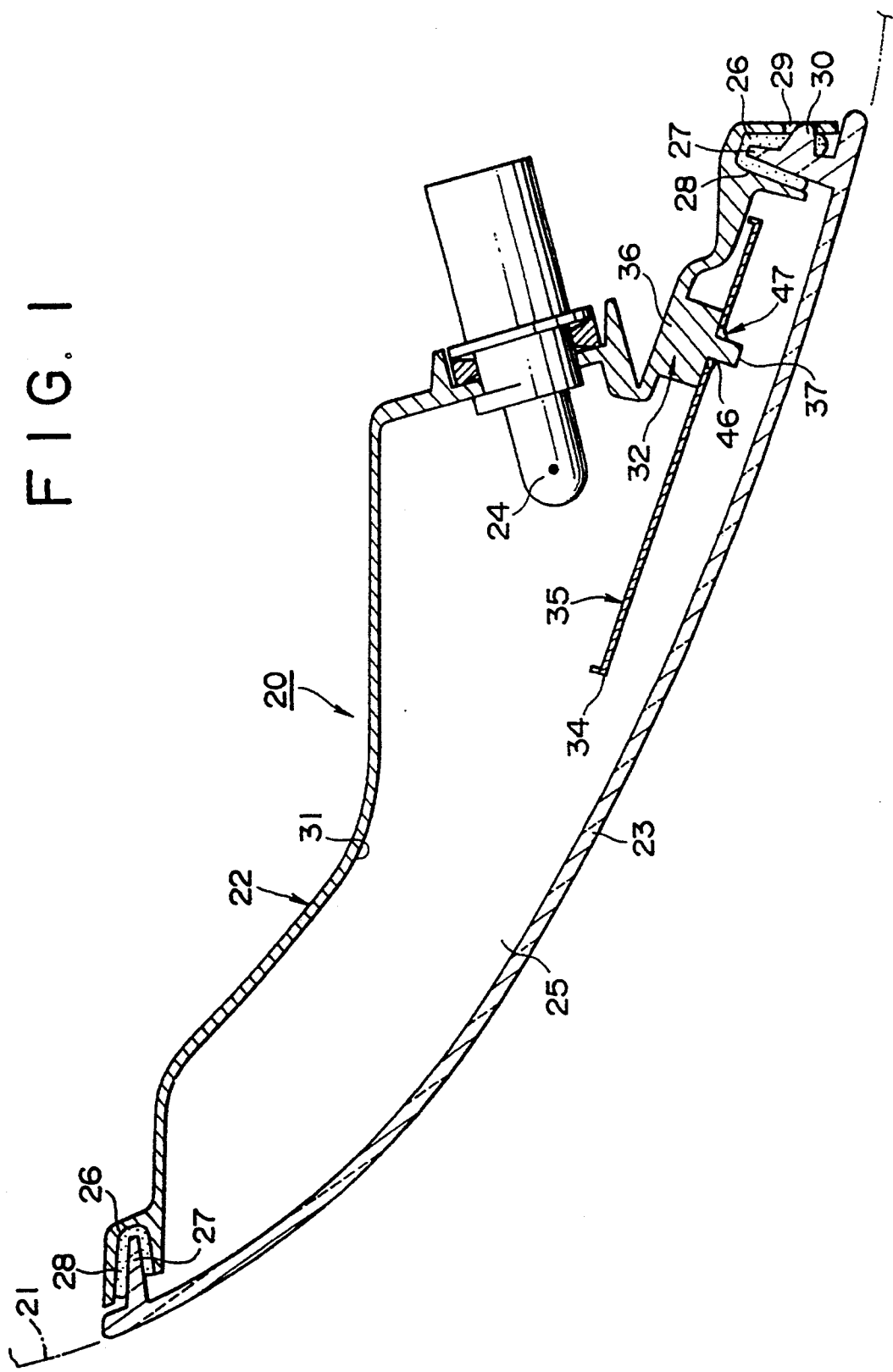
FIG. 1 is a cross-sectional view showing a first embodiment of a vehicle lamp device according to the invention.

FIG. 1 shows a first embodiment of a vehicle lamp device according to the invention.

Referring to FIG. 1, 20 is a side marker lamp as a vehicle lamp device. The side marker lamp 20 is disposed at a left corner of the front 21 of a vehicle body. The side marker lamp 20 includes a lamp housing 22 and a lens 23. A bulb 24 is supported by the lamp housing 22. The lens 23 is curved from the front 21 to the side of the body. The lamp housing 22 includes an opening 25 which is directed both forward and sideward at the corner. A groove 26 for fitting the lens 23 is formed at the periphery of the opening 25 of the lamp housing 22.

The lens 23 is provided with a leg 27 which is fit into the groove 26. The groove 26 is filled with a hot melt material 28. A positioning hole 29 is formed at a given place in a wall of the groove 26. The leg 27 is provided with a projection 30 which is inserted into the positioning hole 29. The leg 27 is affixed to the groove 26 by means of the hot melt material 28, so that the lens 23 is fastened to the lamp housing 22.

The lamp housing 22 is made from synthetic resin. A reflection film is evaporated and coated on the inner surface of the lamp housing 22. A resin projection 32 is formed near a hole for receiving the bulb 24. The projection 33 is integrated with the lamp housing 22 and juts out toward the lens 23.

A shade plate 35, which is a metallic thin plate, is fastened to the resin projection 32. The shade plate 35 may be made of synthetic resin. Preferably, the shade plate 35 is an aluminum thin plate to make it lighter in weight. The shade plate 35 includes a flange 34 extending toward the lamp housing 22. The flange serves to reinforcing the shade plate 35.

The shade plate 35 is located at the side of the front of the vehicle body 21 and is disposed between the lamp housing 22 and the lens 35 to intercept part of a light bundle P emitted from the bulb 24. According to the disposition of the shade plate, a border line between a luminous portion and a dark portion can be made clear. The resin projection 32 is made up of a large circular projection portion 36 for positioning and a small circular projection 37 for fixation.

Figure 2:
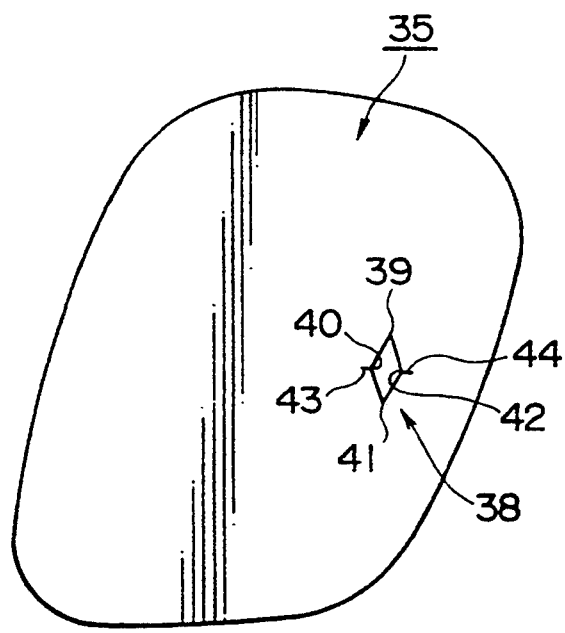
FIG. 2 is a front view of a shade plate shown in FIG. 1.
Figure 3:
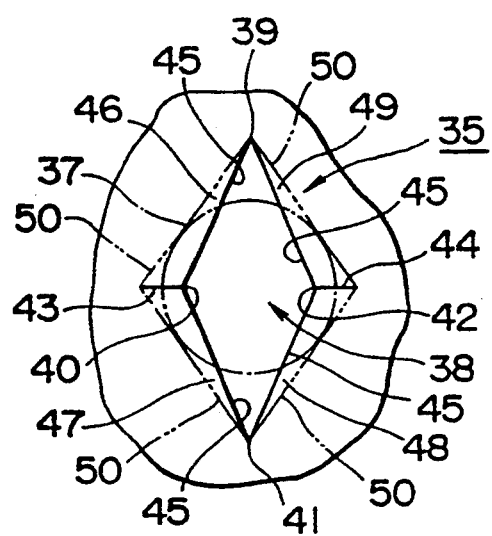
FIG. 3 is an enlarged view showing a fixing hole of the shade plate shown in FIG. 2.

As shown in FIG. 2, a rhombus-shaped fixing hole 38 is formed in the shade plate 35. FIG. 3 is an enlarged view of the hole 38. Reference numerals 39 to 42 each designate a vertex of the rhombus.

The shade plate 35 is provided with a pair of slits 43, 44. These slits 43, 44 are formed around the hole 38 and are extending toward the center of the hole 38. In this embodiment, the slits 43, 44 are formed at a pair of vertexes 40, 42 opposite to each other, respectively.

The length of a diagonal joining the vertexes 40, 42 is less than the diameter of the fixing projection 37, whereas the length of a diagonal joining the vertexes 39, 41 is larger than the diameter of the fixing projection 37.

The pair of slits 43, 44 extends along the diagonal joining the vertexes 40, 42. The lengths of the slits 43, 44 are equal to each other and are each less than a side 45 of the rhombus.

Figure 4:
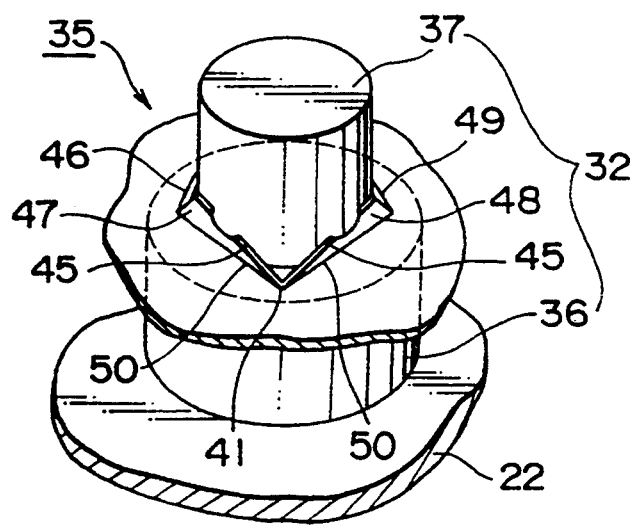
FIG. 4 is a perspective view showing the engagement of a resin projection with the hole shown in FIG. 2.

A plurality of elastic slices 46 to 49 are formed around the hole 38 by means of the slits 43, 44. As shown in FIG. 4, when the projection 37 is inserted into the hole 38, the elastic slices 46 to 49 are raised from bending lines 50, which are each shown by a phantom line in FIG. 3, and are engaged with the projection 37. In this embodiment, the triangle-shaped elastic slices 46 to 49 serve to prevent the shade plate 35 from falling off from the resin projection 32.

Further, in this embodiment, since the edges of the elastic slices 46 to 49 are obliquely engaged with the projection 37 and are inclined in a direction opposite to each other, the shade plate 35 is prevented from spinning due to vibrations of the vehicle.

Figure 5:
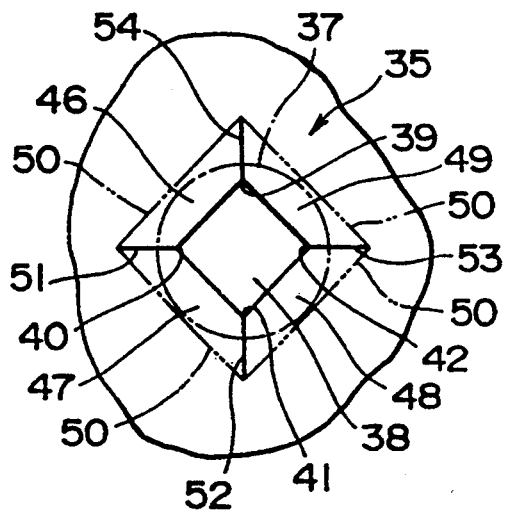
FIG. 5 is an example of the hole formed square-shaped.

FIG. 5 shows a first variant of the shade plate 35 in which the hole 38 is formed square-shaped and slits 51 to 54 are provided extending to the vertexes of the square-shaped hole 38 along the diagonals thereof. In this variant, elastic slices 46 to 49 each are trapezoid-shaped. In the same way as in the embodiment mentioned above, when the projection 37 is inserted into the hole 38, the elastic slices 46 to 49 are raised from bending lines 50 and are engaged with the projection 37.

Figure 6:
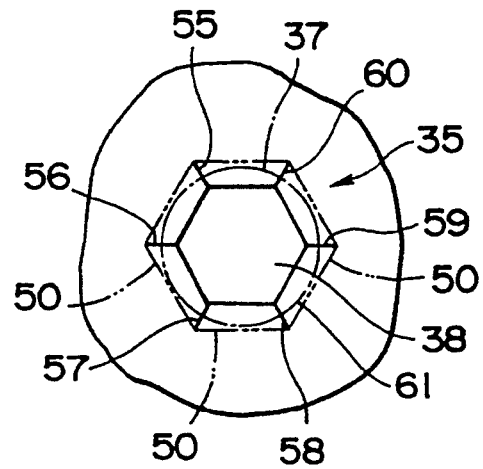
FIG. 6 is an example of the hole formed hexagon-shaped.

FIG. 6 shows a second variant of the shade plate 35 in which the hole 38 is formed hexagon-shaped and slits 55 to 60 extend to the vertexes of the hexagon-shaped hole 38. The more the polygonal hole 38 has its vertexes, the shorter the length of each of the slits can be made, so that the gap 61 between the circular projection 37 and the hole 38 becomes smaller.

Instead of the polygon-shaped hole 38 and the circular projection 37 as shown in the above-mentioned embodiment, one of the polygon-shaped hole 38 and the circular projection 37 may be formed circular and the other elliptical.

Second Embodiment

Figure 7:
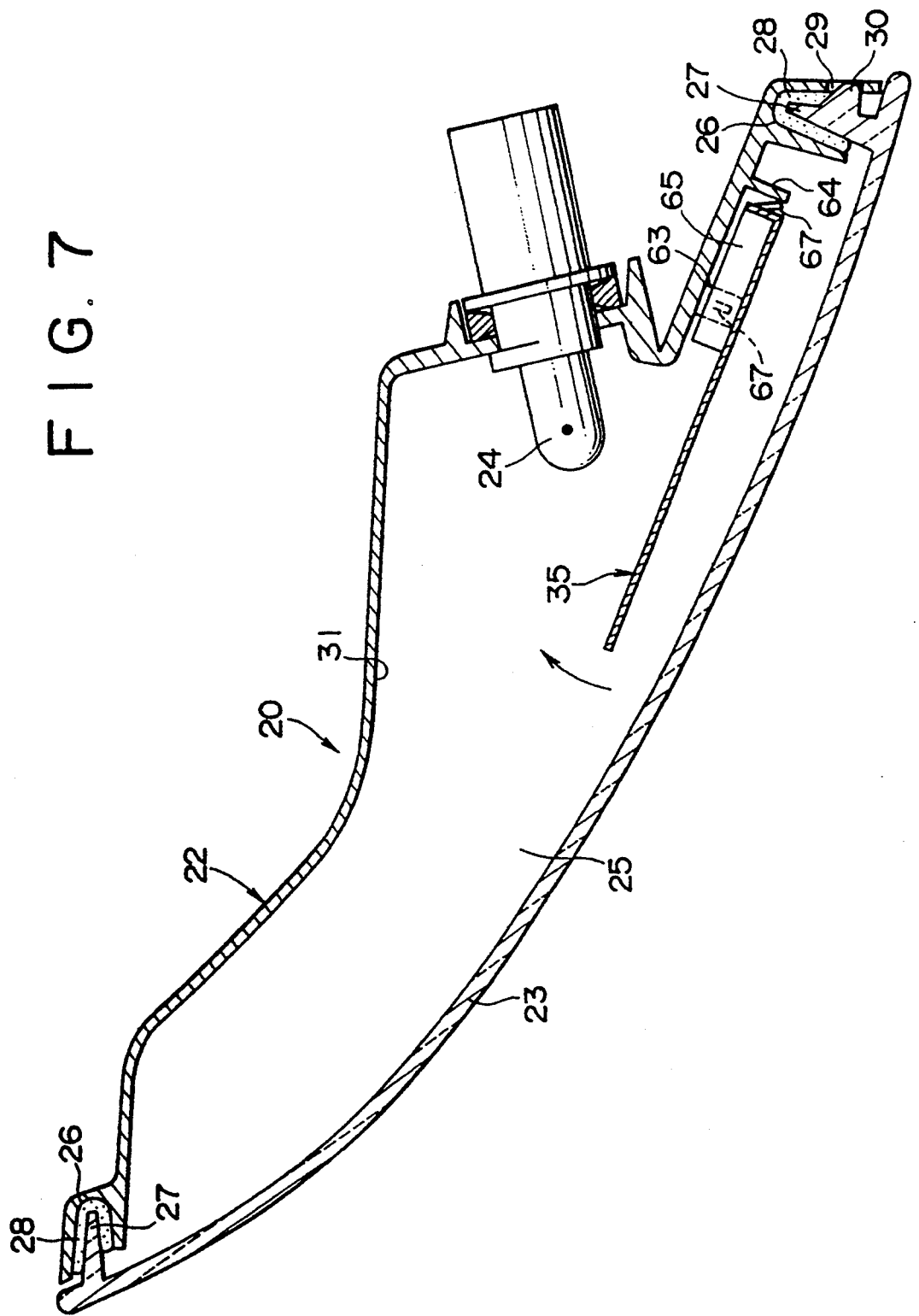
FIG. 7 is a cross-sectional view showing a second embodiment of a vehicle lamp device according to the invention.
Figure 8:
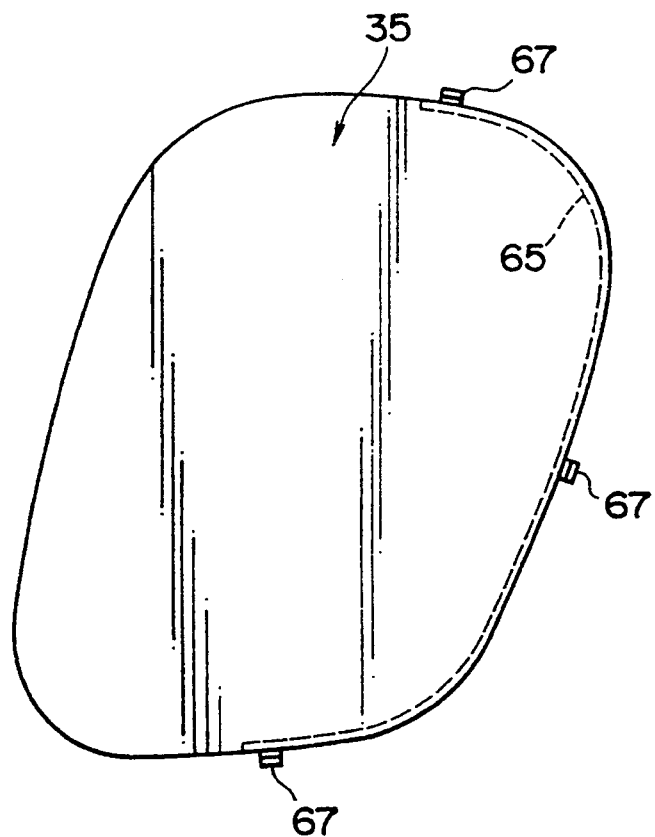
FIG. 8 is a front view of a shade plate shown in FIG. 7.
Figure 9:
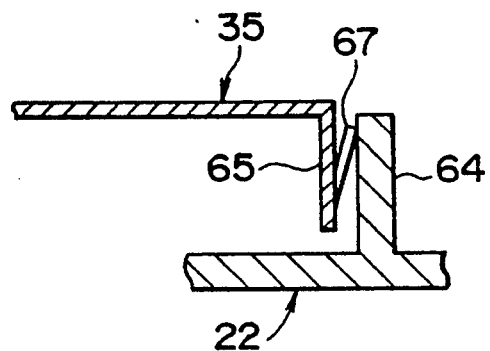
FIG. 9 is an enlarged cross-sectional view showing the engagement of a resin projection with the shade plate shown in FIG. 7.

FIGS. 7 to 9 show a second embodiment of a vehicle lamp device according to the invention.

In the second embodiment, the same numerals are given to the same components as in the first embodiment.

Three resin projections are formed near the bulb 24 and are integrated with the lamp housing 22. Since two of the three are opposite to each other, only one of the two is shown in FIG. 7. Reference numeral 63 is given to the two projections and 64 to the remaining projection.

Part of the edge of the shade plate 35 is bent to be a flange 65 elongated toward the lamp housing 22. As shown in FIG. 8, the flange 65 is provided with slices 67 at the place facing the projections 63, 64. The slices 67 jut out of the flange 65. As shown in FIG. 9, when the shade plate 35 is fit to the projections 63, 64, the elastic slices 67 are engaged with the projections 63, 64.

In this embodiment, the pair of resin projections 63, 63 serve to stabilize the shade plate 35, whereas the other projection 64 serves to prevent the shade plate 35 from rotating with respect to the projections 63, 63 in the arrow direction shown in FIG. 7.

Third Embodiment

Figure 10:
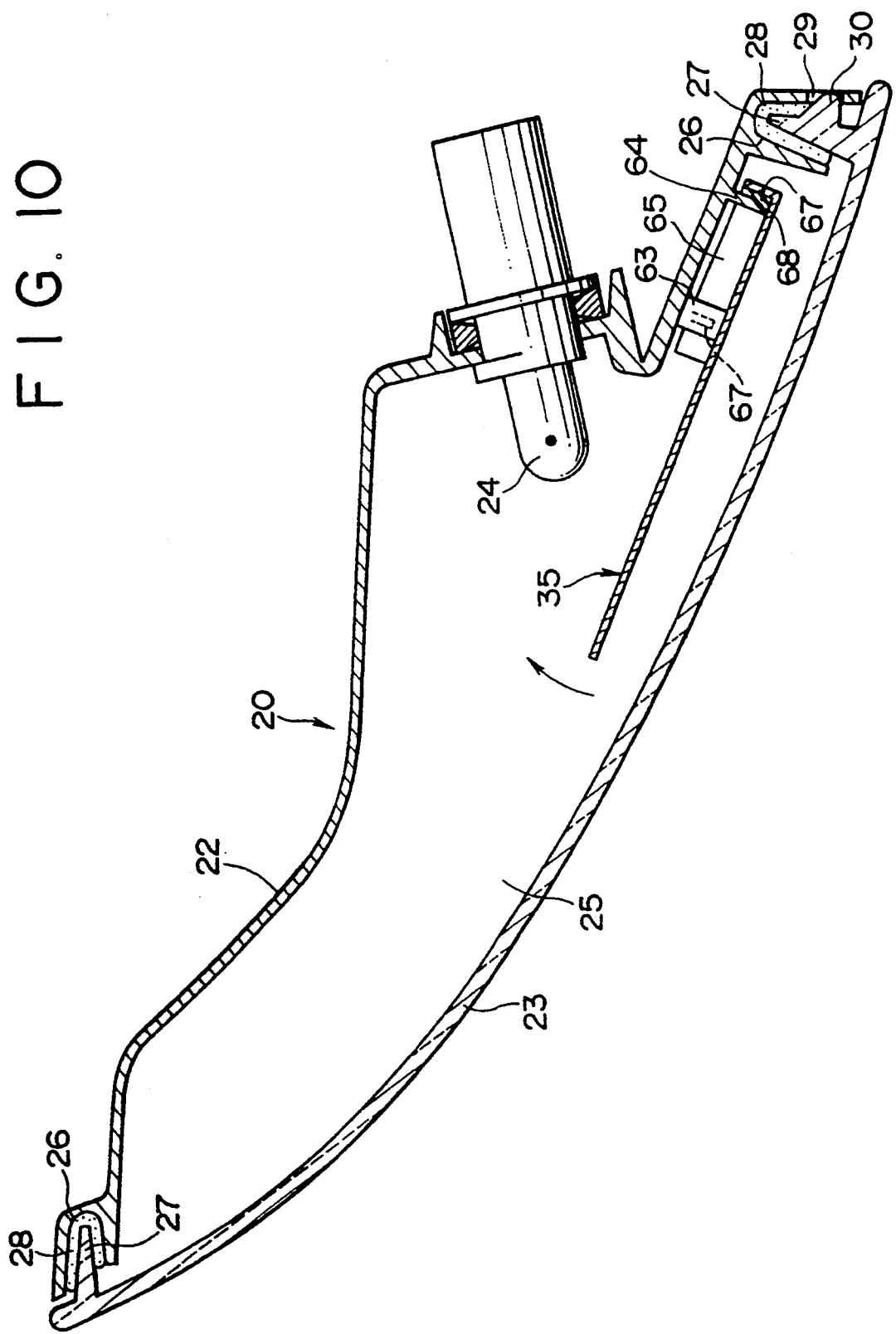
FIG. 10 is a cross-sectional view showing a third embodiment of a vehicle lamp device according to the invention.
Figure 11:
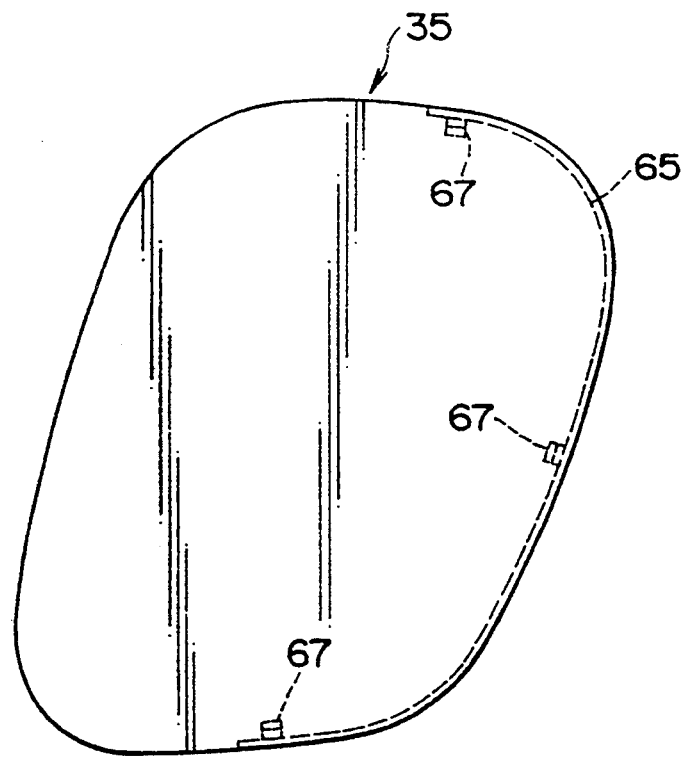
FIG. 11 is a front view of a shade plate shown in FIG. 10.
Figure 12:
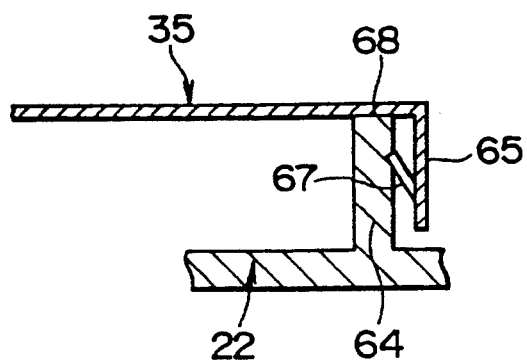
FIG. 12 is an enlarged cross-sectional view showing the engagement of a resin projection with the shade plate shown in FIG. 10.

FIGS. 10 to 12 show a third embodiment of a vehicle lamp device according to the invention. This embodiment is preferable to the second embodiment.

As shown in FIGS. 10 and 11, in this embodiment, the shade plate 35 is provided with elastic slices 67 at given places of the flange 65. The slices 67 juts inward. As shown in FIG. 12 as an enlarged view, the shade plate 35 is fixed to the projections 63, 64 as if covered with a lid. The top faces 68 of the projections 63, 64 serve to position the shade plate 35.

According to the third embodiment, since the projections 63, 64 are covered with the shade plate 35, the lamp device 20 is better in appearance than those in the first and second embodiments.

Further, the second embodiment has a problem in that part of a light bundle emitted from the bulb 24 might come through the gap between the projection 64 and the flange 65. However, such a problem does not occur to the third embodiment.

Further, the projection 64 prevents the shade plate 35 from rotating with respect to the projections 63, 63 in the arrow direction shown in FIG. 10.

Fourth Embodiment

FIGS. 13 to 17 show a fourth embodiment of a vehicle lamp device according to the invention.

The fourth embodiment relates to the application of the vehicle lamp device to a vehicle signal lamp.

Figure 13:
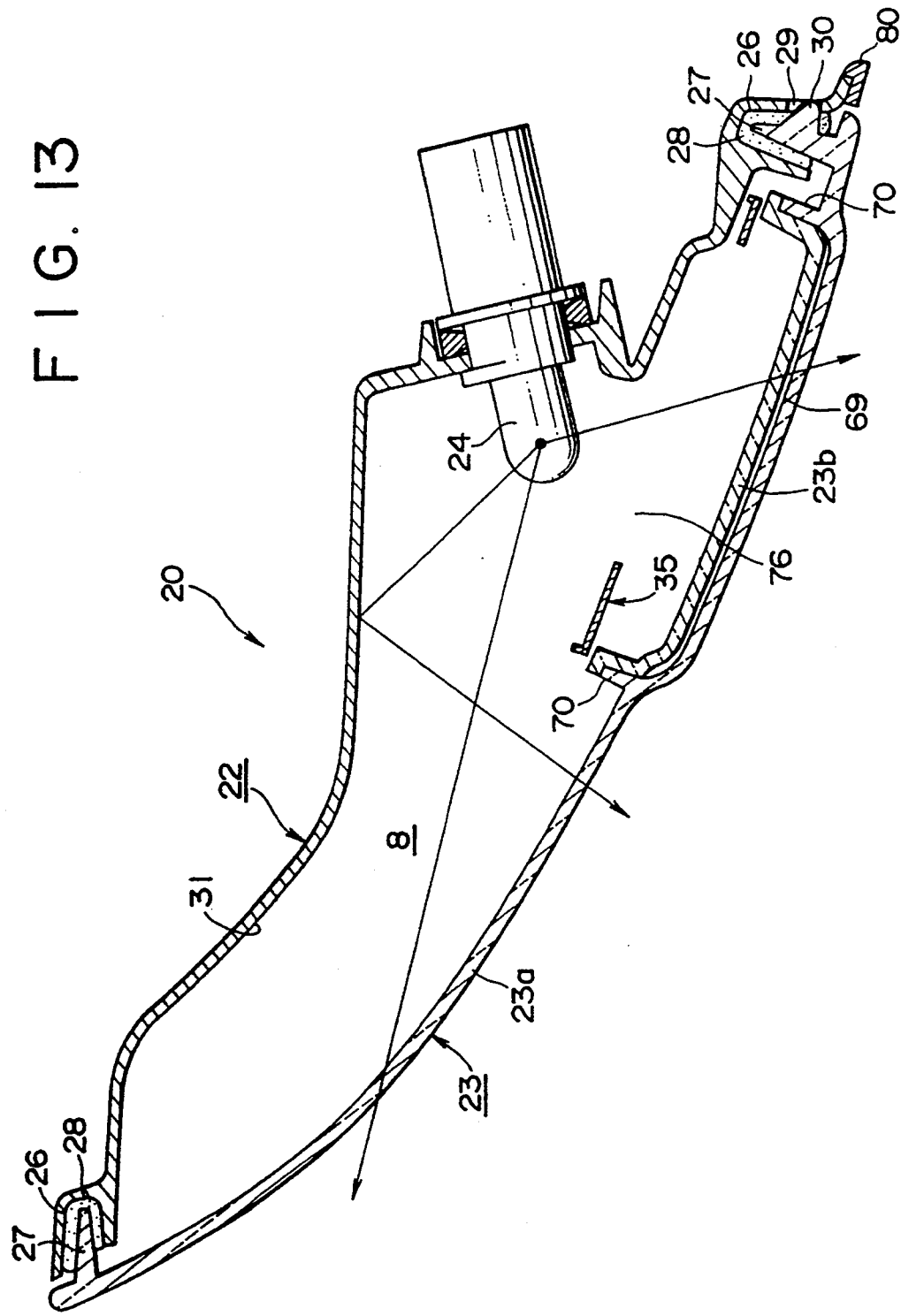
FIG. 13 is a cross-sectional view showing a fourth embodiment of a vehicle lamp device according to the invention, taken along line L1—L1 in FIG. 15.

As shown in FIG. 13, a lens 23 is made up of an outer lens 23a and an inner lens 23b. The outer lens 23a has a fitting portion 69 on the inner face thereof. The fitting portion 69 is located at the side of the front of the vehicle. The fitting portion 69 has wall portions 70. The inner lens 23b made of colored and transparent resin is fit into the fitting portion 69. A color of the inner lens 23b is amber in this embodiment.

Figure 14:
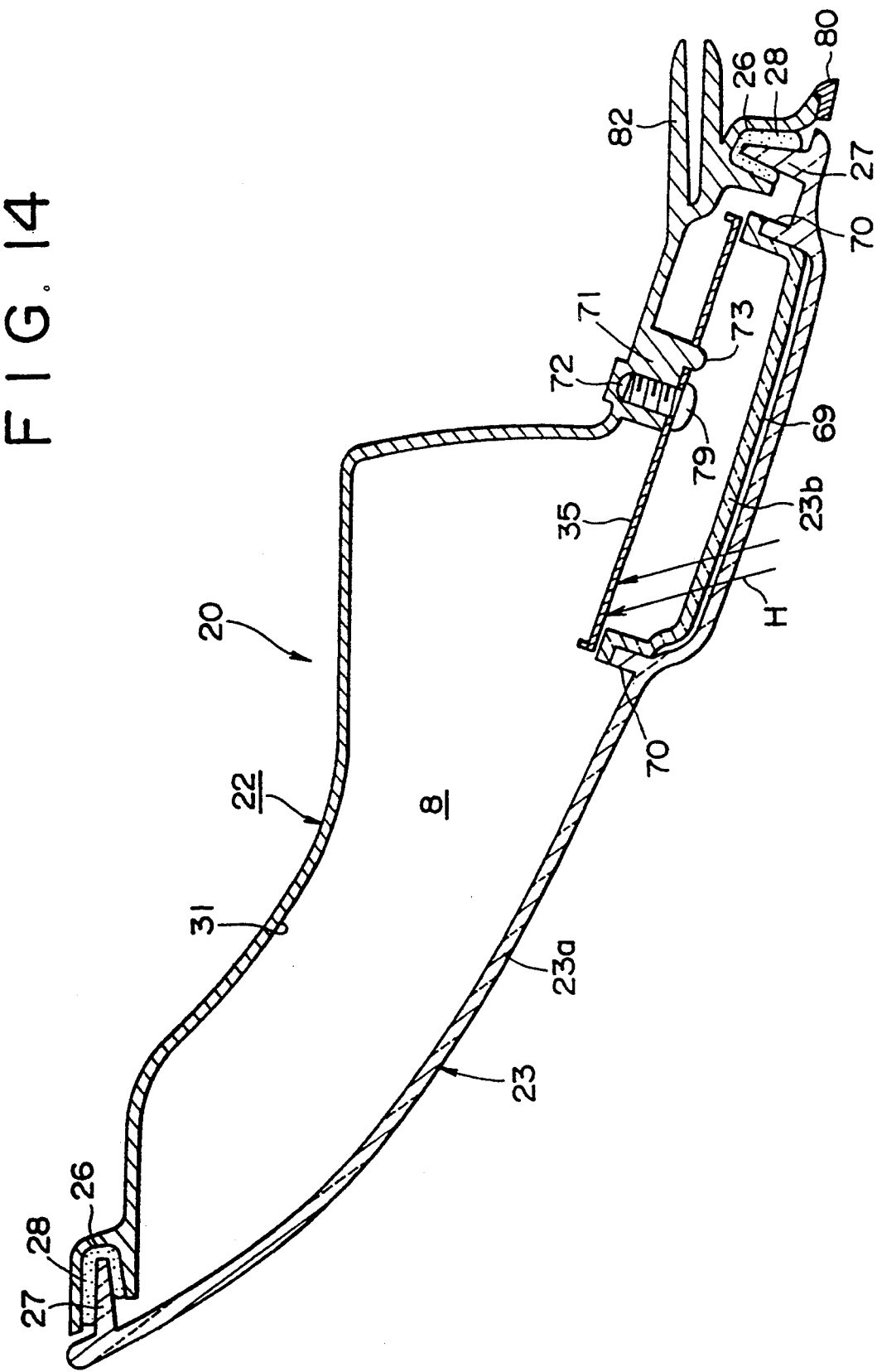
FIG. 14 is a cross-sectional view showing the fourth embodiment of the vehicle lamp device according to the invention, taken along line L2—L2 in FIG. 15.

As shown in FIG. 14, the lamp housing 22 is provided with a projection 71 for fixing a screw. The projection 71 has a hole 72 for a screw 79 and a projection portion 73 for positioning. Two projections 71 for fixing a screw are used in this embodiment.

Figure 15:
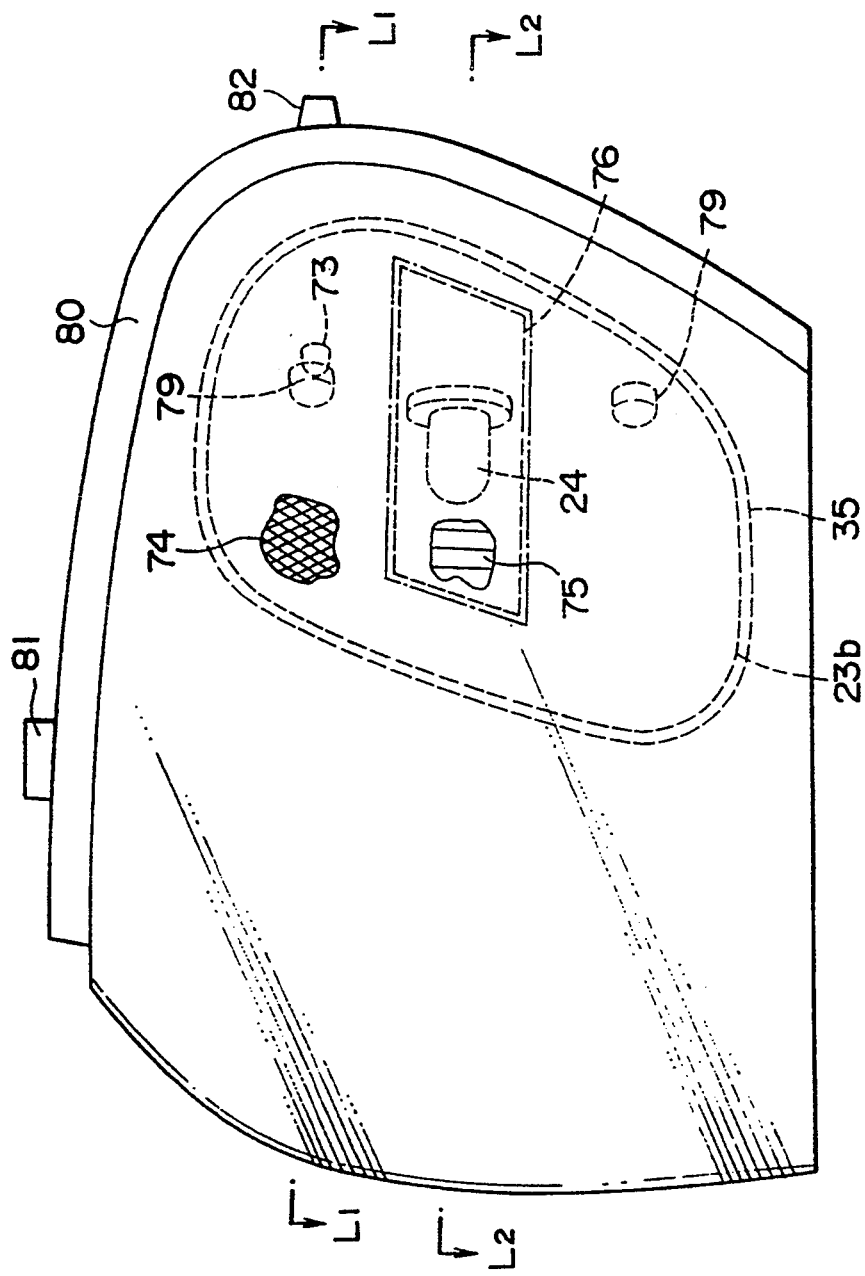
FIG. 15 is a side view showing the fourth embodiment of the vehicle lamp device according to the invention.
Figure 18:
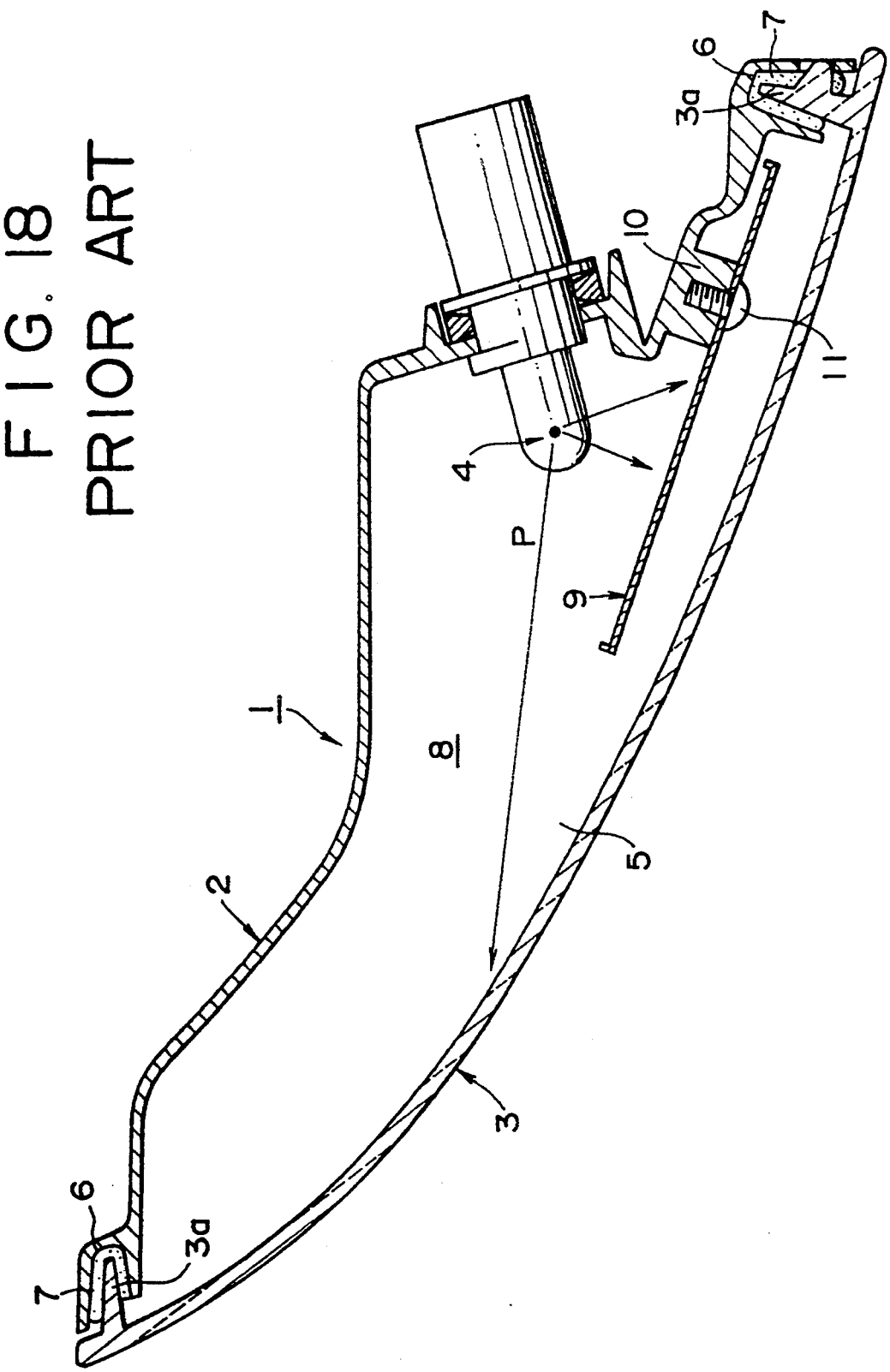
FIG. 18 is a cross-sectional view showing a conventional vehicle lamp device.
Figure 19:
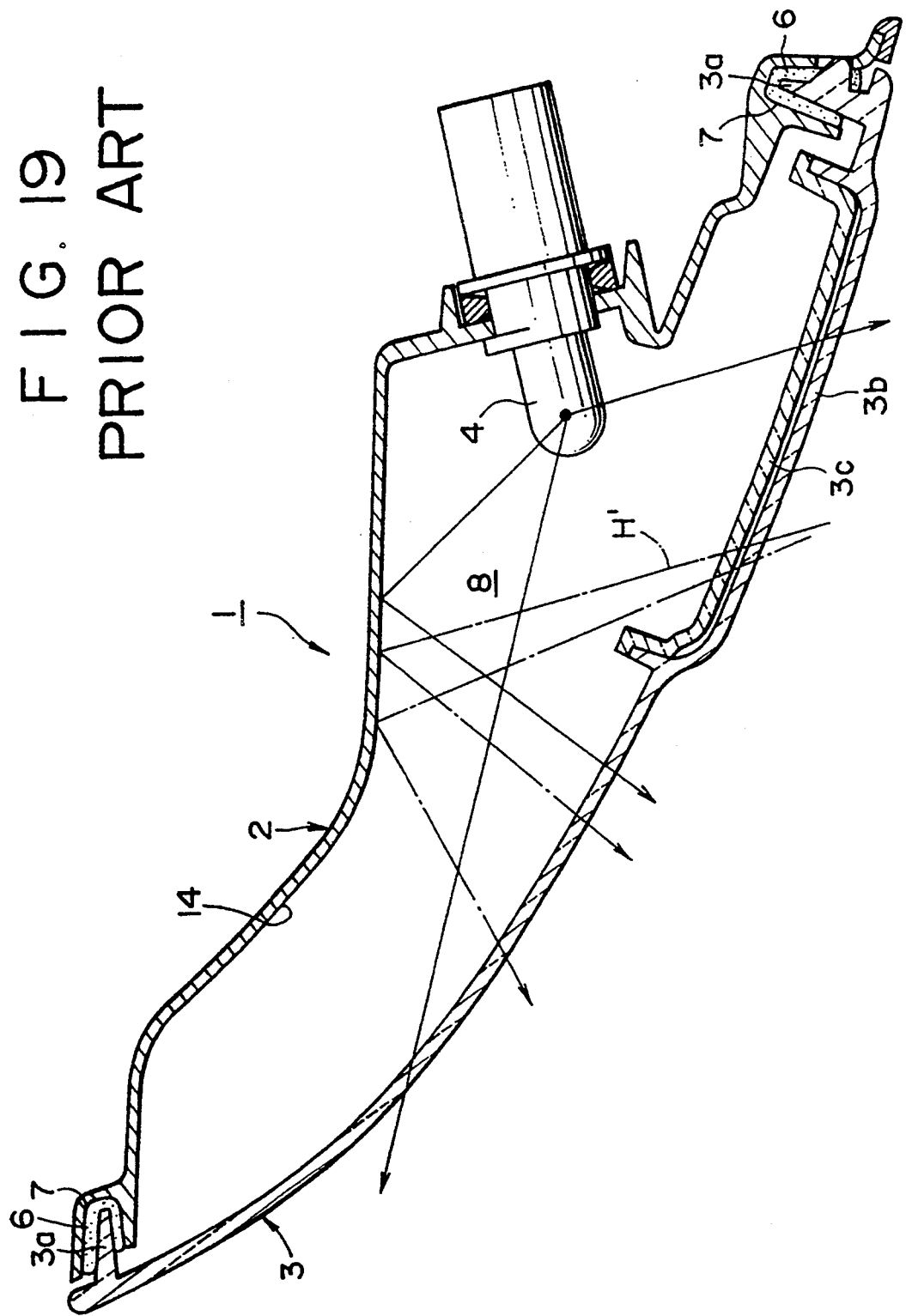
FIG. 19 is a cross-sectional view taken along line L4—L4 in FIG. 20.
Figure 20:
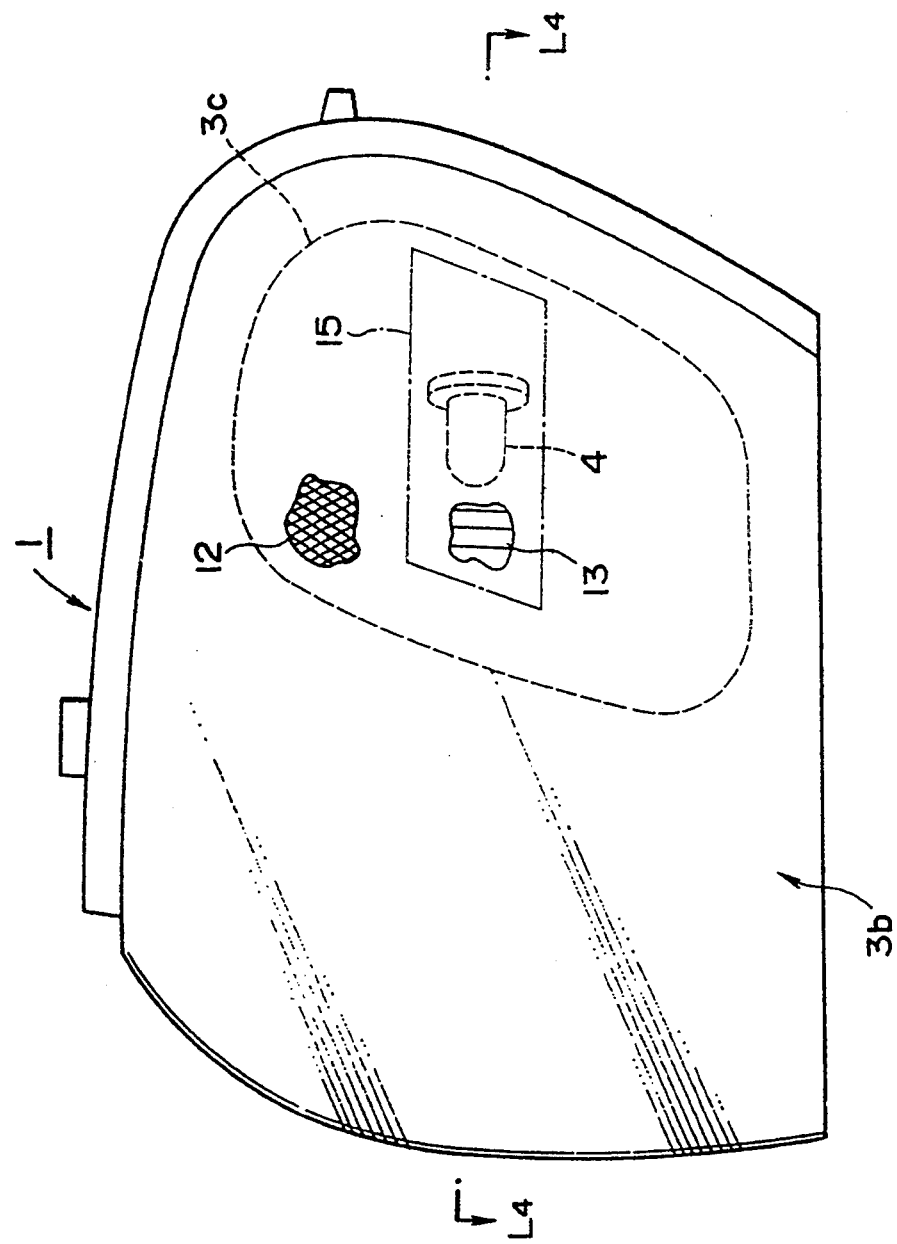
FIG. 20 is a side view showing a conventional vehicle lamp device.

The inner lens 23b serves as a reflex reflector lens and has a reflex reflector lens portion 74 and a side marker lens portion 75 as shown in FIG. 15. The inner lens 23b is disposed along the outer lens 23a. In FIG. 15, the side marker lens portion 75 is enclosed by the alternate long and short dash line. The reflex reflector lens portion 74 serves to reflect light rays coming from the bulb 24 and reflect external light rays incident from the side of the vehicle body back inn the incident direction. The side marker lens portion 75 made of a diffusion lens serves to diffuse and transmit light rays coming from the bulb 24.

As shown in FIG. 16, the shade plate 35 is formed so as to correspond to the peripheral shape of the inner lens 23b. The shade plate 35 has a hole 76 at a place corresponding to the side marker portion 75, screw fitting holes 77 each at a place corresponding to the hole 72, and a positioning hole 78 at a place corresponding to the positioning projection 73. As shown in FIG. 17, a narrow edge portion of the shade plate 35 is bent for reinforcement.

As shown in FIGS. 14 and 15, the positioning hole 78 is first fit with the positioning projection 73 and then the screw 79 is inserted into the hole 72 to fix the shade plate 35 to the lamp housing.

In the fourth embodiment, because the peripheral shape of the shade plate 35 corresponds to that of the inner lens 23b, light rays which have passed through the inner lens 23b into the lamp chamber 8 cannot reach the reflection surface 31 because of the disposition of the shade plate 35.

Further, because only the light rays which have passed through the hole 76 of the shade plate from the bulb 24 can reach the side marker lens portion 75, whereas the remaining light rays emitted by the bulb 24 are intercepted by the shade plate 35, the border line 15 of the side marker lens portion 75 is made clear. If the shade plate 35 is formed so as to correspond to the shape of the inner lens and the shade plate 35 is disposed still nearer to the inner lens 23b, the border line 15 is made much clearer.

Further, because light rays H which have passed through the reflex reflector lens portion 74 from the outside of the vehicle are intercepted by the shade plate and cannot reach the lamp housing 22, the reflection film 31 assumes no color. Therefore, the lamp device 20 is improved in appearance.

The vehicle lamp device is not limited to that arranged such that the lens 23 is made up of the outer and inner lenses 23a, 23b and the inner lens 23b serves as a reflex reflector lens as shown in the fourth embodiment. For example, a reflex reflector lens may be formed integrated with the lens 23 at a concave rear portion of the lens 23. Further, a reflex reflector lens may be disposed outside the lens 23.

Referring again to FIG. 15, 80 designates a mold disposed around the lamp housing, and 81 and 82 each designate a projection for fixing the lamp device to the vehicle body.

What is claimed is:

1. A vehicle lamp device comprising:
   a lamp housing supporting a bulb;
   a lens fixed in an opening of said lamp housing;
   a reflex reflector lens provided along said lens; and
   a shade plate disposed between said lamp housing and said reflex reflector lens, for intercepting a part of a light bundle emitted from said bulb, a peripheral shape of said shade plate corresponding to a peripheral shape of said reflex reflector lens;
   wherein said reflex reflector lens includes a side marker portion and said shade plate is provided with an opening opposite to said side marker portion.

2. A vehicle lamp device according to claim 1, wherein said shade plate is fixed to said lamp housing by means of a screw.

3. A vehicle lamp device according to claim 2, further comprising a boss, formed on said lamp housing, for fixing said shade plate; said boss being provided with a projection integrated with said boss, for positioning said shade plate; and said shade plate being provided with a hole for said screw and a positioning hole for said projection.

4. A vehicle lamp device according to claim 2, wherein said shade plate is a metallic thin plate, a plurality of bosses for fixing said shade plate are formed on said lamp housing, at least one of said bosses is provided with a projection integrated with said boss for positioning said shade plate, and said shade plate is provided with a plurality of holes through which said screw passes and a positioning hole into which said projection is fit.

5. A vehicle lamp device according to claim 1, wherein said vehicle lamp device is a signal lamp, said opening of said housing is directed to both the front and the side of a vehicle's body, and said lamp device is disposed at a corner of said vehicle's body.

6. A vehicle lamp device comprising:
   a lamp housing supporting a bulb;
   a lens fixed in an opening of said lamp housing, said opening of said lamp housing being directed to both the front and the side of a vehicle's body and disposed at a corner of said vehicle's body;
   a reflex reflector lens provided along said lens; and
   a thin shade plate, disposed between said lamp housing and said reflex reflector lens and fixed to said lamp housing, for intercepting a part of a light bundle emitted from said bulb, a contour of said thin shade plate corresponding to a contour of said reflex reflector lens.

7. A vehicle lamp device comprising:
   a lamp housing supporting a bulb;
   a lens fixed in an opening of said lamp housing;
   a reflex reflector lens provided along said lens; and
   a shade plate disposed between said lamp housing and said reflex reflector lens, for intercepting a part of a light bundle emitted from said bulb, a peripheral shape of said shade plate corresponding to a peripheral shape of said reflex reflector lens;
   wherein said shade plate is fixed to said lamp housing by means of a screw.

8. A vehicle lamp device according to claim 7, further comprising a boss, formed on said lamp housing, for fixing said shade plate; said boss being provided with a projection integrated with said boss, for positioning said shade plate; and said shade plate being provided with a hole for said screw and a positioning hole for said projection.

9. A vehicle lamp device according to claim 7, wherein said shade plate is a metallic thin plate, a plurality of bosses for fixing said shade plate are formed on said lamp housing, at least one of said bosses is provided with a projection integrated with said boss for positioning said shade plate, and said shade plate is provided with a plurality of holes through which said screw passes and a positioning hole into which said projection is fit.

* * * * *